(12) United States Patent
Avasarala et al.

(10) Patent No.: US 10,257,702 B2
(45) Date of Patent: Apr. 9, 2019

(54) VALIDATING INTERNATIONAL MOBILE EQUIPMENT IDENTITY (IMEI) IN MOBILE NETWORKS

(71) Applicant: AT&T Intellectual Property I, L.P., Atlanta, GA (US)

(72) Inventors: Ranjit Kumar Avasarala, Buffalo Grove, IL (US); Vamsidhar Sivadi, Aurora, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/699,914

(22) Filed: Sep. 8, 2017

(65) Prior Publication Data

US 2019/0082320 A1   Mar. 14, 2019

(51) Int. Cl.
*H04W 24/02* (2009.01)
*H04W 12/06* (2009.01)
*H04L 29/06* (2006.01)
*G06Q 50/26* (2012.01)
*G06Q 30/04* (2012.01)

(52) U.S. Cl.
CPC ......... *H04W 12/06* (2013.01); *H04L 63/0876* (2013.01); *G06Q 30/04* (2013.01); *G06Q 50/265* (2013.01)

(58) Field of Classification Search
CPC ... G06Q 10/02; G06Q 20/4014; H04W 4/008; H04W 4/021; H04L 9/3268; H04L 63/08; H04L 63/126; H04L 9/0819
USPC .............................. 455/418; 370/328; 726/17
See application file for complete search history.

(56) References Cited

U.S. PATENT DOCUMENTS

| 9,271,251 | B2 | 2/2016 | Narkar et al. |
| 9,603,006 | B2 | 3/2017 | Evans et al. |
| 9,705,938 | B2 | 7/2017 | Ionescu |
| 9,729,997 | B2 | 8/2017 | Chen et al. |
| 9,730,112 | B2 | 8/2017 | Adams et al. |
| 2009/0069001 | A1 | 3/2009 | Cardina et al. |
| 2011/0271330 | A1 | 11/2011 | Zhang |
| 2014/0086147 | A1 | 3/2014 | Narkar et al. |
| 2014/0335831 | A1 | 11/2014 | Lamberton et al. |
| 2015/0006898 | A1 | 1/2015 | Mizikovsky |

(Continued)

FOREIGN PATENT DOCUMENTS

CN          102256215 A      11/2011

OTHER PUBLICATIONS

"3rd Generation Partnership Project; Technical Specification Group Core Network; Numbering, addressing and identification (Release 5)" 3GPP TS 23.003 V5.11.0, Jun. 2006, 39 pages.

(Continued)

*Primary Examiner* — Phuoc H Doan
(74) *Attorney, Agent, or Firm* — Amin, Turocy & Watson, LLP

(57) ABSTRACT

A control plane entity can perform validation checks to confirm the validity of a device identifier, for example, an international mobile equipment identity (IMEI), received from a user equipment (UE) during registration of the UE with a communication network. In one aspect, the control plane entity can verify that the IMEI conforms to a defined format; for example, the IMEI is fifteen digits long, does not comprise alphabets and/or symbols, and/or comprises a valid type allocation code (TAC) of eight decimal digits, etc. The validation of the IMEI can reduce errors in billing that can otherwise result in revenue loss for the service provider.

20 Claims, 11 Drawing Sheets

(56) References Cited

U.S. PATENT DOCUMENTS

2016/0080423 A1  3/2016  Milinski et al.
2017/0041843 A1  2/2017  Tian et al.
2017/0201884 A1  7/2017  Zhong

OTHER PUBLICATIONS

Montemurro, et al. "A Uniform Resource Name Namespace for the Global System for Mobile Communications Association (GSMA) and the International Mobile station Equipment Identity (IMEI)" Internet Engineering Task Force (IETF) Request for Comments: 7254, ISSN: 2070-1721, May 2014, 16 pages.

Allen, et al. "Using the International Mobile station Equipment Identity (IMEI) Uniform Resource Name (URN) as an Instance ID" Internet Engineering Task Force (IETF) Request for Comments: 7255, ISSN: 2070-1721, May 2014, 9 pages.

VALIDATING INTERNATIONAL MOBILE EQUIPMENT IDENTITY (IMEI) IN MOBILE NETWORKS

TECHNICAL FIELD

The subject disclosure relates to wireless communications, e.g., for validating international mobile equipment identity (IMEI) in mobile networks.

BACKGROUND

Network service providers utilize call detail records (CDRs) to track communication sessions and facilitate subscriber billing. Typically, the CDRs comprise a record of each voice call and/or data session associated with a subscriber device that has been performed via the service provider's network. CDRs are collected in real time at core network switches within the network, for example, converged telephony service (CTS) for voice sessions and a session gateway for data sessions. These CDRs provide a variety of information, such as, connection times, duration, international mobile subscriber identity (IMSI) and/or international mobile equipment identity (IMEI) associated with origination and termination devices, etc.

The IMEI information is utilized to map a subscriber to device parameters such as, a device type, a device make, a device model and an operating system (OS) version. Oftentimes, the IMEI information is modified based on updates to the device (e.g., software version change (upgrade/downgrade), change in type, make or model, etc.). Invalid IMEIs can result in generation of incorrect CDRs leading to billing issues for the network service provider.

DETAILED DESCRIPTION

Figure 1:
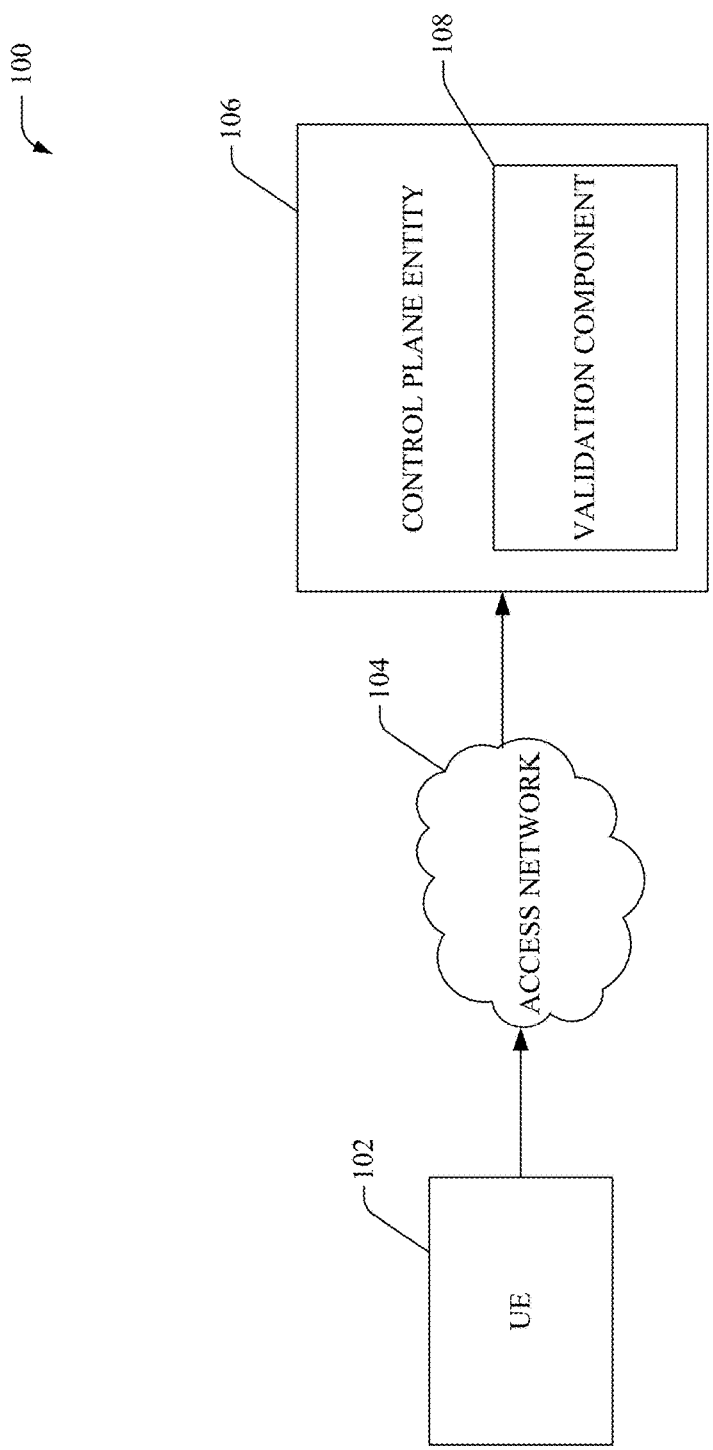
FIG. 1 illustrates an example system that facilitates validation of a hardware identifier of a user equipment (UE) during subscriber registration.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth. Further, it is noted that the term "upstream" as used herein refers to a direction in which data sent for a "stream" flowing from a user equipment to a network service provider device (or content provider device or application provider device). As an example, if a first device is closer to (fewer hops away from) the network service provider device than a second device, then the first device is said to be upstream from the second device or conversely, the second device is downstream from the first device.

It should be noted that although various aspects and embodiments have been described herein in the context of long term evolution (LTE) and/or other next generation networks, the disclosed aspects are not limited to LTE implementation. As an example, aspects or features of the disclosed embodiments can be exploited in substantially any wireless communication technology. Such wireless communication technologies can include universal mobile telecommunications system (UMTS), code division multiple access (CDMA), Wi-Fi, worldwide interoperability for microwave access (WiMAX), general packet radio service (GPRS), enhanced GPRS, third generation partnership project (3GPP), LTE, third generation partnership project 2 (3GPP2) ultra mobile broadband (UMB), high speed packet access (HSPA), evolved high speed packet access (HSPA+), high-speed downlink packet access (HSDPA), high-speed uplink packet access (HSUPA), Zigbee, or another IEEE 802.XX technology. Additionally, substantially all aspects disclosed herein can be exploited in fifth generation (5G) and/or other next generation networks and/or legacy telecommunication technologies.

A mobile device is typically assigned a hardware identifier that uniquely identifies the specific mobile device. As an example, the mobile device can be assigned an international mobile equipment identity (IMEI) or IMEI Software Version (SV) (herein both are referred to as "IMEI"). The IMEI is a unique (or semi-unique) hardware identifier that comprises device information, such as but not limited to, the origin, manufacturer, model, and serial number of a mobile device.

In one aspect, when the mobile device registers with a communication network (e.g., cellular network), the network devices receive the IMEI during the registration. Among other things, the IMEI can be utilized to determine whether the mobile device is stolen, flagged, and/or banned, to help to identify subscription parameters/plans associated with the device, to push device-specific content to the mobile device, to regulate use of the mobile device, and/or to facilitate billing. In an example scenario, receiving an incorrect and/or invalid IMEI can lead to errors in billing that can result in revenue loss for the service provider. The systems and methods disclosed herein enable core network entities, for example, mobility management entity (MME), packet gateway (PGW), serving-call session control function (S-CSCF) and/or IMS-HSS etc. to validate the IMEI and detect errors in IMEI that would otherwise result in inaccurate billing. Aspects and/or features of the disclosed subject matter can be exploited in substantially any wired or wireless communication technology, including, but not limited to 4G and/or future technologies.

Referring initially to FIG. 1, there illustrated is an example system 100 that facilitates validation of a hardware identifier of a user equipment (UE), according to one or more aspects of the disclosed subject matter. In an aspect, the UE 102 can connect to and/or register with a communication network (e.g., a cellular network) via one or more access networks 104 (e.g., a radio access network (RAN)) and one or more core network devices of the communication network, for example, a control plane entity 106. As an example, a core network of a communication network can comprise devices (e.g., gateways, servers, data stores, etc.) that provide communication services to user equipment (UE), which are connected to the communication network via a wired and/or wireless access network 104. In one aspect, UE 102 can comprise, but is not limited to most any industrial automation device and/or consumer electronic device, for example, a tablet computer, a digital media player, a wearable device, a digital camera, a media player, a cellular phone, a personal computer, a personal digital assistant (PDA), a smart phone, a laptop, a gaming system, set top boxes, home security systems, an Internet of things (IoT) device, a connected vehicle, at least partially automated vehicle (e.g., drones), etc.

According to an embodiment, the control plane entity 106 can comprise a validation component 108 that can validate an identifier, for example, an IMEI, received from the UE 102. As an example, the UE 102 can transmit the IMEI as part of a request (e.g., session initiation protocol (SIP) request or other session request) for initiating a voice and/or data session and/or for registering with the communication network. Typically, the IMEI conforms to a standard format; for example, the IMEI can be fifteen decimal digits long and can comprise a type allocation code (TAC) of eight decimal digits, a serial number (SNR) of six decimal digits, and a spare decimal digit. The TAC can be indicative of the type of the UE 102 and can be selected from a range of values allocated to the UE 102's manufacturer to identify the model, make, and/or version of the UE 102. The SNR can comprise an individual serial number that uniquely identifies each device within the TAC. Further, the spare digit can be employed as a check digit to validate the IMEI and is set to the value 0 when transmitted by the UE 102. Moreover, the spare digit can be utilized to avoid manual reporting errors (e.g., when customers register stolen mobiles at the operator's customer care desk) and additionally, to help guard against the possibility of incorrect entries being provisioned in the network equipment. In one aspect, during signaling, the IMEI can conform to a format comprising fifteen decimal digits encoded in eight octets, for example, using binary-coded decimal (BCD). It is noted that the subject specification is not limited to the 15 decimal digit format described herein and that an IMEI conforming to most any defined format (e.g., defined by the service provider and/or by industry standards) can be utilized and/or validated.

In one aspect, the identifier, for example, the IMEI can be utilized to generate charging data records (CDRs) that are utilized to facilitate billing. Typically, the CDRs comprise a record of communication sessions associated with a subscriber that has been established via the service provider network (e.g., cellular network). The CDRs provide a variety of information associated with the communication session, such as, but not limited to, connection times, duration, origination IMSI, and/or termination IMSI, originating number IMEI, etc. Moreover, the CDRs can be collected in real time at the core switches of the communication network (e.g., mobile switching center collects voice CDRs and session gateway collects data CDRs) to generate a bill for a subscriber.

The IMEI is utilized to map the subscriber to device type, make, model, and/or OS version. For example, the last two digits of IMEI can indicate a software version (SV) utilized by UE 102, a first set of digits of the IMEI can indicate a type, make, and/or model of the UE 102, etc. When the UE 102 is changed/upgraded, the IMEI is correspondingly changed so that service providers are aware of the characteristics of device being used. In addition, the IMEI can be utilized to detect whether the subscriber is using a banned, flagged, blacklisted, and/or stolen phone. In an example scenario, if the subscriber changes the UE 102, for example, by inserting the subscriber identity module (SIM) card into a new device that has not been purchased from authorized sources (e.g., authorized company stores or URL) and/or has been purchased from another country, the IMEI provided by/stored within the new device may be invalid or incorrect. In another example scenario, the UE 102 can be tampered with to change the IMEI stored within the UE 102 to an incorrect and/or invalid value. This invalid IMEI (also called Bad IMEI) can result in generation of incorrect CDRs and can cause billing issues for the service providers (e.g., correct subscriber is not billed for services used).

To avoid generation of incorrect CDRs, system 100 employs the validation component 108 that can perform one or more validation checks to verify that the IMEI received within a subscriber-registration message is valid/correct. In one aspect, the validation component 108 can verify that the received identifier conforms to a defined format (e.g., defined by a network operator and/or industry standards). For example, the validation component 108 can verify that the IMEI comprises a fifteen-digit number without any characters (e.g., alphabets and/or symbols). Further, the validation component 108 can verify that the IMEI comprises a valid type allocation code (TAC) code. If the validation component 108 determines that the IMEI is invalid (e.g., the length of the IMEI is greater than or less than 15, the IMEI comprises alphabets or symbols, the IMEI does not conform to a defined format, etc.), an error message can be transmitted and/or the UE can be prohibited from connecting to and/or communicating via the communication network. Alternatively, if the validation component 108 determines that the IMEI is valid, the subscriber registration process can be continued (e.g., appropriate messages can be forwarded to network servers to facilitate registration of the UE 102 with the communication network and/or establish a communication session).

Additionally or optionally, the validation component 108 can perform an identity check to determine whether the UE 102 is blacklisted. For example, the validation component 108 can communicate with an equipment identity register (EIR) that stores a list of IMEIs of blacklisted and/or flagged UEs to determine whether the IMEI of UE 102 matches an IMEI stored in the EIR. If a match is detected, an error message can be transmitted to the UE 102, the UE 102 can be prohibited from connecting to and/or communicating via the communication network, and/or authorized personnel can be contacted (e.g., police can be contacted in case of a stolen phone). If a match is not detected, the subscriber registration process can be continued (e.g., appropriate messages can be forwarded to network servers). It is noted that the validation component 108 can perform the verification only for non-emergency sessions (e.g., non-911 calls). In one aspect, if the validation component 108 determines that the UE 102 has requested an emergency service, the validation of the IMEI can be skipped and the appropriate messages can be transmitted to establish the emergency session (e.g., regardless of validity of the IMEI).

It is noted that in one or more example embodiments, the control plane entity 106 can comprise a virtual network device. For example, virtual networks can implement functions of infrastructure nodes in software on commercial "off-the-shelf" computing equipment. Virtualization can decrease capital and/or operating costs, reduce time for deployment of new services, improve energy savings, and/or enhance network efficiency. In one ore more example embodiments, the architecture disclosed in system 100 facilitates application of network functions virtualization (NFV) and/or software-defined networking (SDN) technologies. NFV can virtualize network services that have been conventionally carried out by proprietary, dedicated hardware/software and instead host the network services on one or more virtual machines (VMs). Using NFV, network service providers do not need to purchase proprietary/dedicated hardware devices to enable a service. NFV can improve scalability and flexibility and network capacity can easily be adjusted through software, resulting in reduced capital expenses and/or operating expenses. NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral.

Figure 2:
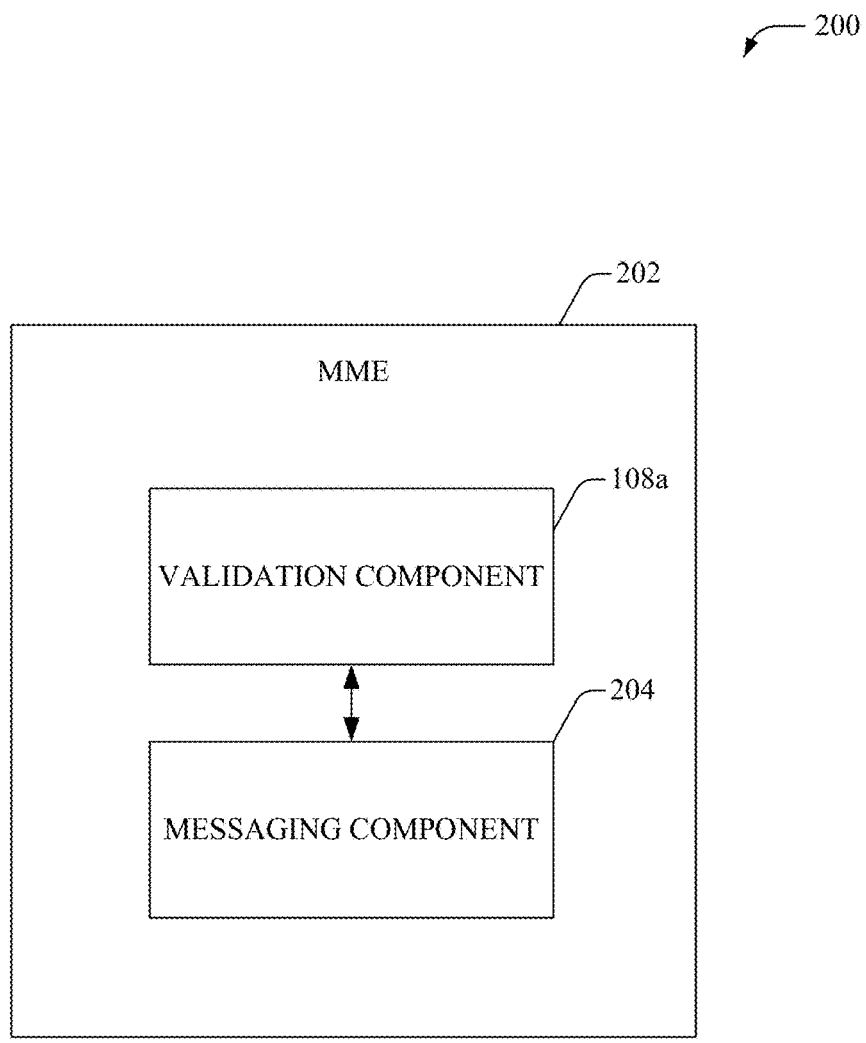
FIG. 2 illustrates an example system that employs a mobility management entity (MME) for validating an international mobile equipment identity (IMEI).

Referring now to FIG. 2, there illustrated is an example system 200 that utilizes a MME for validating an IMEI, in accordance with an aspect of the subject disclosure. It is noted that the MME 202 can be substantially similar to control plane entity 106 and can comprise functionality as more fully described herein, for example, as described above with regards to control plane entity 106. Further, validation component 108a can be substantially similar to validation component 108 and can comprise functionality as more fully described herein, for example, as described above with regards to validation component 108. Among other functions, the MME 202 can perform idle mode UE paging and/or tagging procedures. Additionally, the MME 202 can facilitate a bearer activation/deactivation process and can be utilized to select a serving gateway (SGW) for a UE at the initial attach and/or handovers. Further, the MME 202 can communicate with a network data store (e.g., home subscriber server (HSS)) to authenticate the user/UE.

As part of a subscriber registration process, a messaging component 204 of the MME 202 can receive a request from a served UE (e.g., UE 102) to initiate a communication session (e.g., voice and/or data session). In one aspect, the request can include (and/or be appended with) identifier data, for example, the IMEI assigned to the UE. The IMEI can then be propagated to various upstream devices (e.g., to PGW and all the way to the IP multimedia subsystem (IMS) core). For example, the IMEI can be included within (and/or appended to) the following messages as part of subscriber registration: a create session request (CSR) transmitted from the MME 202 to a SGW/PGW; a credit control request (CCR) transmitted from the PGW to a policy and charging enforcement function (PCEF); and session initiation protocol (SIP) register request transmitted from the UE to a IMS core device.

According to an aspect, prior to propagating the IMEI, the validation component 108a can check whether the IMEI fetched by the MME 202 is valid. In some cases (e.g., the UE has been purchased from another country or has been tampered with to change IMEI value), the IMEI fetched by the MME 202 can be incorrect or invalid. For example, if the MME 202 receives an IMEI having an invalid format (e.g., that comprises alphabets and/or symbols, etc.), the MME 202 can convert the IMEI into a numerical value by converting the alphabets and/or symbols into numbers. However, this new IMEI can also be invalid since its length can be greater than fifteen digits. Further, the new value does not map the UE to appropriate device information (e.g., make, model, software version, etc.).

In an aspect, to verify the validity of the IMEI, the validation component 108a can perform various checks. For example, the validation component 108a can check the length of the received IMEI, can determine whether the received IMEI comprises alphabets or symbols, can determine whether the received IMEI conforms to a defined format, can determine whether a set of digits (e.g., first 8 digits) of the received IMEI can be interpreted as a TAC code, and can verify that the TAC code matches a list of valid TAC codes (e.g., stored within a data store of the communication network), etc. Moreover, the validation component 108a can determine that the received IMEI is invalid when its length is greater than a defined value (e.g., fifteen digits), it comprises alphabets or symbols, it does not conforms to the defined format, the set of digits do not represent a TAC code format, and/or the TAC code does not match the list of valid TAC codes, etc. Additionally or optionally, the validation component 108 can perform an identity check (e.g., via communication with the DR) to determine whether the UE is blacklisted. If determined that the IMEI is invalid (and/or blacklisted), the MME 202 can deny the request from the UE and/or provide (e.g., via messaging component 204) an error message to the UE indicative of the invalid IMEI. As an example, on receiving such an error message, the user of the UE can contact customer support to resolve the issue.

If determined (e.g., by the validation component 108a) that the IMEI is valid, the messaging component 204 can generate a CSR message and transmit the CSR message to a SGW/PGW. An example CSR message comprises the IMEI (e.g., fetched by MME 202) in a MEI parameter is shown below:

Mobile Equipment Identity (MEI): 3572160700228832
IE Type: Mobile Equipment Identity (MEI) (75)
IE Length: 8
0000 . . . =CR flag: 0
. . . 0000=Instance: 0
(MEI) Mobile Equipment Identity: 3572160700228832

In the above example message, the IMEI is "357216070022288" and "32" is the software version utilized by the UE.

Figure 3:
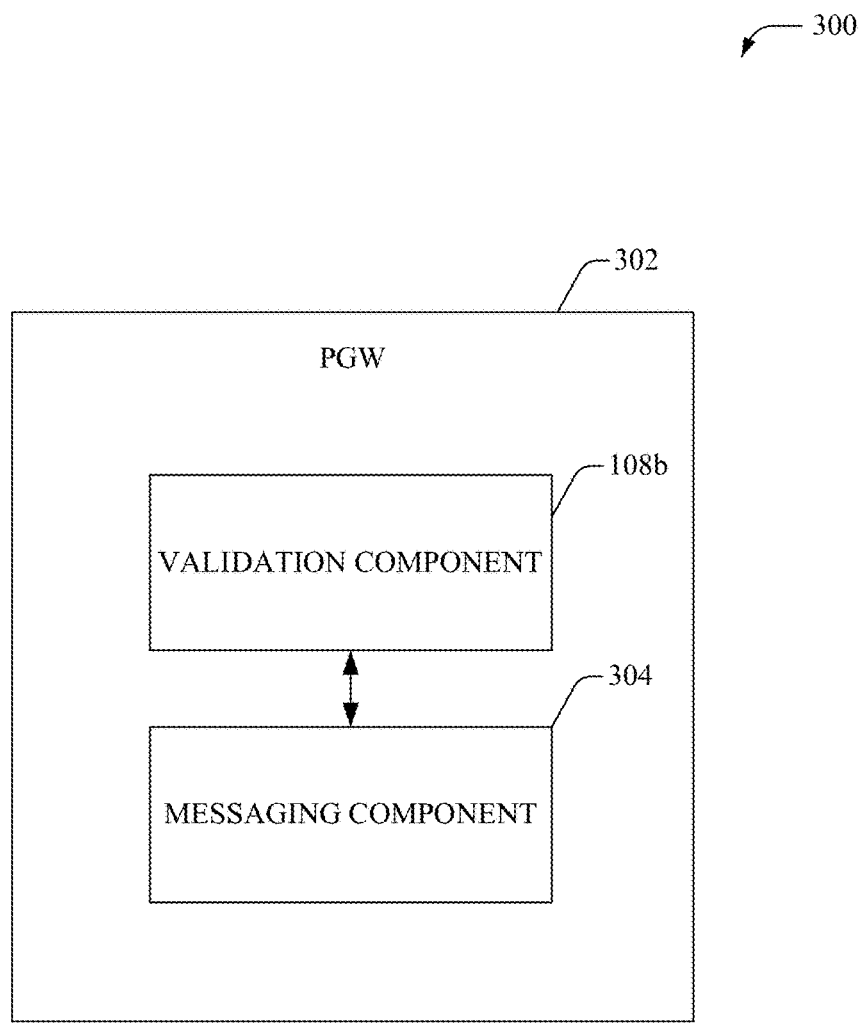
FIG. 3 illustrates an example system that employs a packet gateway (PGW) for validating an IMEI.

Referring now to FIG. 3, there illustrated is an example system 300 that employs a PGW for validating an IMEI, in accordance with an aspect of the subject disclosure. It is noted that the PGW 302 can be substantially similar to control plane entity 106 and can comprise functionality as more fully described herein, for example, as described above with regards to control plane entity 106. Further, validation component 108b can be substantially similar to validation component 108 and can comprise functionality as more fully described herein, for example, as described above with regards to validation component 108. Among other functions, the PGW 302 can "anchor" mobility between 3GPP and non-3GPP technologies. The PGW 302 can provide connectivity from the UE (e.g., UE 102) to external packet data network (PDN) by being the point of entry or exit of traffic for the UE. Additionally, the PGW 302 can facilitate policy enforcement, packet filtration for users, charging support, etc.

As part of a subscriber registration process, a messaging component 304 of the PGW 302 can receive a message, for example, a CSR message, from a MME that serves the UE. In one aspect, the message can comprise (and/or be appended with) identifier data, for example, the IMEI assigned to the UE. The IMEI can then be propagated to various upstream devices (e.g., to a PCEF via a CCR message). According to an aspect, prior to propagating the IMEI, the validation component 108b can extract the IMEI from the received message and check whether the IMEI is valid. For example, a diameter CCR received by PGW 302 from the MME can comprise the IMEI in User-Equipment-Info attribute-value pair (AVP). In one aspect, the PGW 302 can perform the extraction by removal of digits between the IMEI digits.

In some cases (e.g., the UE has been purchased from another country or has been tampered with to change IMEI value), the IMEI provided by the MME 202 can be incorrect or invalid. In an aspect, to verify the validity of the IMEI, the validation component 108b can perform various checks. For example, the validation component 108b can check the length of the received IMEI, can determine whether the received IMEI comprises alphabets or symbols, can determine whether the received IMEI conforms to a defined format, can determine whether a set of digits (e.g., first eight digits) of the received IMEI can be interpreted as a TAC code, and can verify that the TAC code matches a list of valid TAC codes (e.g., stored within a data store of the communication network), etc. Moreover, the validation component 108b can determine that the received IMEI is invalid when its length is greater than a defined value (e.g., fifteen digits), it comprises alphabets or symbols, it does not conforms to the defined format, the set of digits do not represent a TAC code format, and/or the TAC code does not match the list of valid TAC codes, etc. If determined that the IMEI is invalid, the messaging component 304 can provide an error message (e.g., CS response with error: 96 IMSI/IMEI Not known (invalid)) to the MME to request a retransmission and/or to instruct the MME to deny the request from the UE (and/or provide an error message to the UE indicative of the invalid IMEI). If the IMEI is determined to be valid, the messaging component 304 can forward the IMEI to a PCEF, for example, within a CCR.

Figure 4:
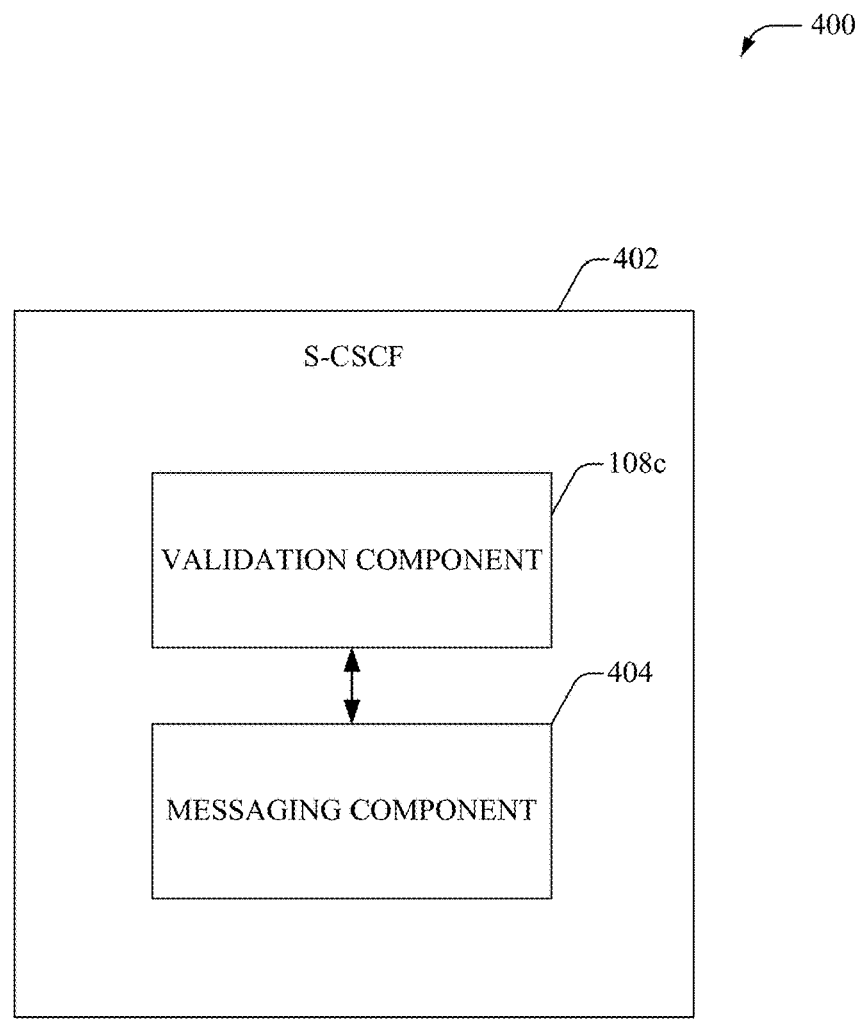
FIG. 4 illustrates an example system that employs a serving-call session control function (S-CSCF) for validating an IMEI.

Referring now to FIG. 4, there illustrated is an example system 400 that employs a S-CSCF for validating an IMEI, according to an aspect of the subject disclosure. It is noted that the S-CSCF 402 can be substantially similar to control plane entity 106 and can comprise functionality as more fully described herein, for example, as described above with regards to control plane entity 106. Further, validation component 108c can be substantially similar to validation component 108 and can comprise functionality as more fully described herein, for example, as described above with regards to validation component 108. Among other functions, the S-CSCF 402 can facilitate processing of the location registration of a UE (e.g., UE 102), user authentication, and/or call routing and processing.

As part of a subscriber registration process, a messaging component 404 of the S-CSCF 402 can receive a message, for example, a SIP register message. In one aspect, the SIP message can comprise (and/or be appended with) identifier data, for example, the IMEI assigned to the UE. As an example, the IMEI can be included within a +sip.instance parameter within a header of the SIP message. It is noted that the subject specification is not limited to the IMEI being included in the header and most any portion of the message can comprise the IMEI and/or the IMEI can be appended to the message or sent within a different message. The IMEI can then be propagated to various upstream devices. According to an aspect, prior to propagating the IMEI, the validation component 108c can extract the IMEI from the received message and check whether the IMEI is valid. In one embodiment, the S-CSCF 402 can receive the IMEI in a sip.instance parameter of SIP contact header of a SIP REGISTER message in the following format:-TAC-SNR-SV. For example, +sip.instance="<urn:gsma:imei:99000493-686661-0>"; here 99000493 is the TAC, 68661 is the SNR and 0 is the Software Version Number (SVN).

In an aspect, the validation component 108c can perform various checks to validate the IMEI. For example, the validation component 108c can check the length of the received IMEI (TAC+SNR+SV), can determine whether the received IMEI comprises alphabets or symbols, can determine whether the received IMEI conforms to a defined format (e.g., a TAC-SNR-SV format and/or included within < >, etc.), can determine whether a set of digits (e.g., first 8 digits) of the received IMEI can be interpreted as a TAC code, and can verify that the TAC code matches a list of valid TAC codes (e.g., stored within a data store of the communication network), etc. Moreover, the validation component 108c can determine that the received IMEI is invalid when its length is greater than a defined value (e.g., fifteen digits), it comprises alphabets or symbols, it does not conform to the defined format (e.g., not a TAC-SNR-SV format and/or not included within < >, etc.), the set of digits do not represent a TAC code format, and/or the TAC code does not match the list of valid TAC codes, etc. If determined that the IMEI is invalid, the messaging component 404 can provide an error message (e.g., 400 Bad Request and Reason: "bad IMEI") and/or deny the request from the UE (and/or provide an error message to the UE indicative of the invalid IMEI).

Alternatively, if the IMEI is determined to be valid, the messaging component 404 can continue processing of the request by converting the IMEI from TAC-SNR-SV format to a continuous digits format (e.g., remove the dash symbols (-)). Further, the messaging component 404 can build a UE AVP and add IMEI to the User-Equipment-Value and then add (and/or append) the UE AVP to a user authorization request (UAR) message that is provided to a IMS-HSS as part of subscriber registration.

Figure 5:
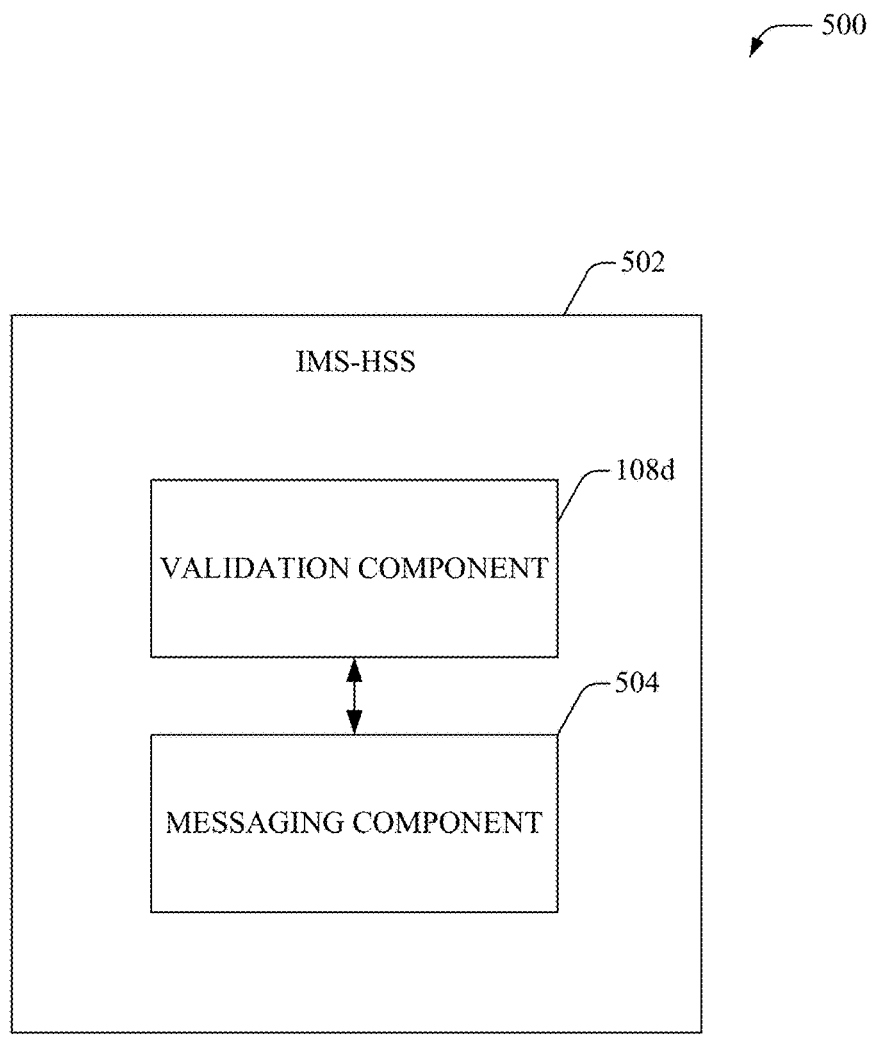
FIG. 5 illustrates an example system that employs a IP multimedia session home subscriber subsystem (IMS-HSS) for validating an IMEI.

Referring now to FIG. 5, there illustrated is an example system 500 that employs a IMS-HSS for validating an IMEI, according to an aspect of the subject disclosure. It is noted that the IMS-HSS 502 can be substantially similar to control plane entity 106 and can comprise functionality as more fully described herein, for example, as described above with regards to control plane entity 106. Further, validation component 108d can be substantially similar to validation component 108 and can comprise functionality as more fully described herein, for example, as described above with regards to validation component 108. As an example, the IMS-HSS 502 can comprise one or more data stores that store subscriber information.

As part of a subscriber registration process, a messaging component 504 of the IMS-HSS 502 can receive a message, for example, a UAR message, from the S-CSCF. In one aspect, the UAR message can comprise (and/or be appended with) identifier data, for example, the IMEI assigned to the UE. As an example, the IMEI can be included within a User Equipment Info AVP within message. According to an aspect, the validation component 108d can extract the IMEI from the received message and check whether the IMEI is valid.

In an aspect, the validation component 108d can perform various checks to validate the IMEI. For example, the validation component 108d can check the length of the received IMEI, can determine whether the received IMEI comprises alphabets or symbols, can determine whether the received IMEI conforms to a defined format, can determine whether a set of digits (e.g., first 8 digits) of the received IMEI can be interpreted as a TAC code, and can verify that the TAC code matches a list of valid TAC codes (e.g., stored within a data store of the communication network), etc. Moreover, the validation component 108d can determine that the received IMEI is invalid when its length is greater than a defined value (e.g., fifteen digits), it comprises alphabets or symbols, it does not conform to the defined format, the set of digits do not represent a TAC code format, and/or the TAC code does not match the list of valid TAC codes, etc. If determined that the IMEI is invalid, the messaging component 404 can provide an error message (e.g., user authorization answer (UAA) setting error: DIAMETER_INVALID_MOBILE_IDENTITY) to the S-CSCF, which in turn can responds to the UE with an error message (e.g., 400 Bad Request with Reason: "Bad IMEI"). In one example, on receiving the error message, the user/owner of the UE can get their device certified by the service provider/customer support. Alternatively, if the IMEI is determined to be valid, the messaging component 504 can continue processing of the SIP request to initiate the communication session.

Systems 200-500 provide example network entities that validate the IMEI. It is noted that the validation of the IMEI can be performed by one or more of the above entities within a network. Moreover, the subject specification is not limited to IMEI validation by a MME, PGW, S-CSCF, SDW, but most any network entity that receives the IMEI as part of protocol messages transmitted to them, that utilizes the IMEI for certain processing, and/or that transmits the IMEI for further processing. In one example, an upstream entity can determine that the IMEI has not been validated by a downstream entity and then perform the validation. In another example, entities that perform validation can be selected by the service provider/network operator. In yet another example, an upstream entity can determine that the IMEI has been validated by a downstream entity and then skip the validation.

Figure 6:
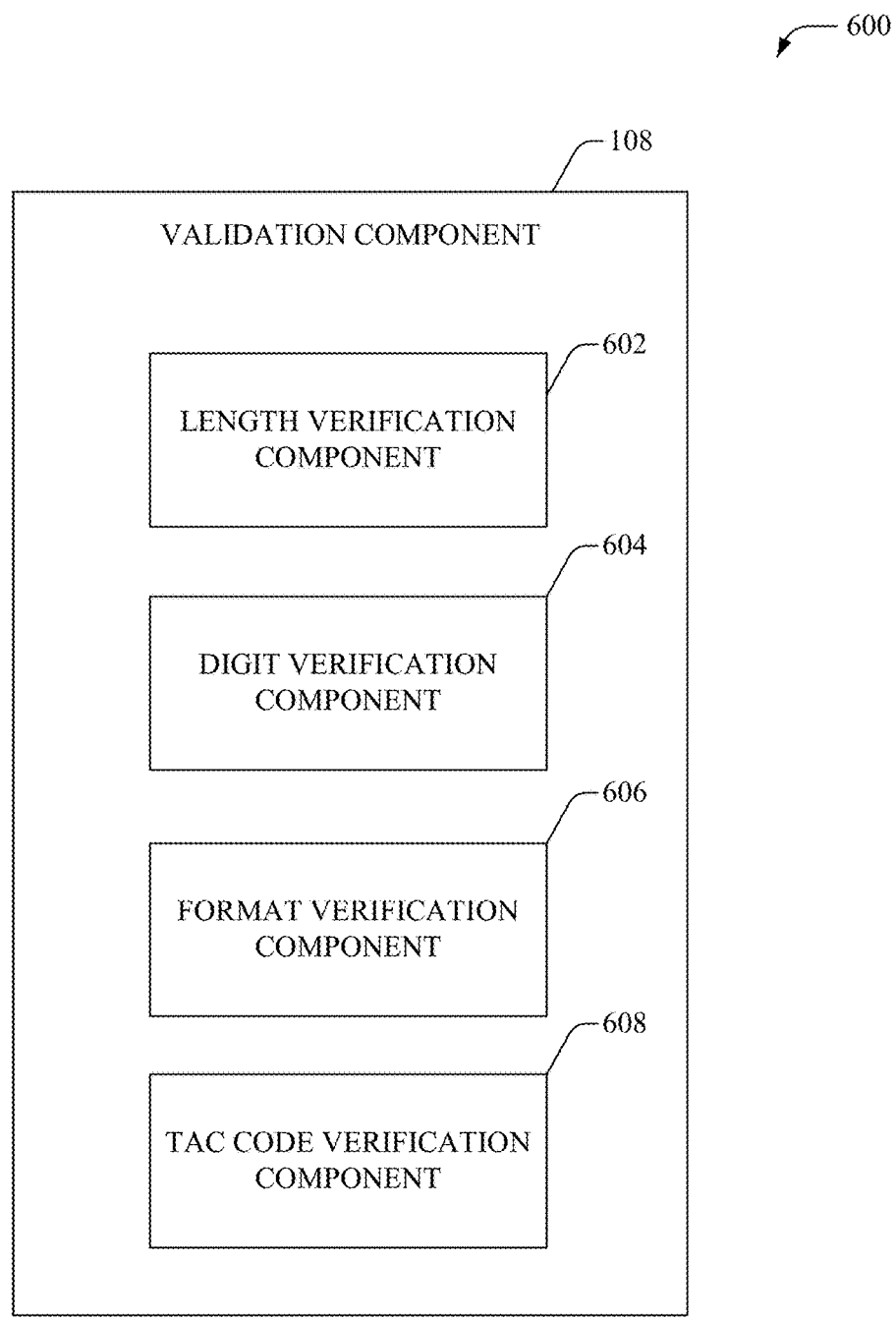
FIG. 6 illustrates an example system that determines a validity of a received IMEI.

FIG. 6 illustrates and example system 600 that determines a validity of a received IMEI. It is noted that validation component 108 can comprise functionality as more fully described herein, for example, as described above with regards to system 100.

According to one embodiment, the validation component 108 can comprise a length verification component 602 that can verify that the length of the received and/or extracted IMEI satisfies a defined length criterion. For example, the length verification component 602 can check whether the IMEI comprises fifteen digits. If the defined length criterion is satisfied (e.g., the IMEI comprises exactly fifteen digits), the IMEI is determined to be valid. Alternatively, if the defined length criterion is not satisfied (e.g., the IMEI comprises greater than or fewer than fifteen digits), the IMEI is determined to be invalid.

Further, in another embodiment, the validation component 108 can comprise a digit verification component 604 that can verify that the digits of the received and/or extracted IMEI satisfies a defined digit criterion. For example, the digit verification component 604 can check whether all the digits of the IMEI are whole numbers and do not comprise alphabets or special characters. If the defined digit criterion is satisfied (e.g., the IMEI comprises whole numbers), the IMEI is determined to be valid. Alternatively, if the defined digit criterion is not satisfied (e.g., the IMEI comprises one ore more alphabets and/or special characters), the IMEI is determined to be invalid.

In another embodiment, the validation component 108 can comprise a format verification component 606 that can verify that the format of the received and/or extracted IMEI satisfies a defined format criterion. For example, the format verification component 606 can check whether the received and/or extracted IMEI conforms to a defined format, for example, the first 8 digits are a TAC code, there are no more than X number of zeros (e.g., wherein X is more any integer), the digits are in a TAC-SNR-SVN format, the digits are included between "<" and ">" symbols, etc. If the defined format criterion is satisfied (e.g., the IMEI conforms to the defined format), the IMEI is determined to be valid. Alternatively, if the defined format criterion is not satisfied (e.g., the IMEI does not conform to the defined format), the IMEI is determined to be invalid.

In yet another embodiment, the validation component 108 can comprise a TAC code verification component 608, which can verify that the TAC code within the received and/or extracted IMEI matches one of a set of valid TAC codes (e.g., stored in a network data store). If the IMEI matches one of a set of valid TAC codes, the IMEI is determined to be valid. Alternatively, if the IMEI does not match one of a set of valid TAC codes, the IMEI is determined to be invalid.

Figure 7:
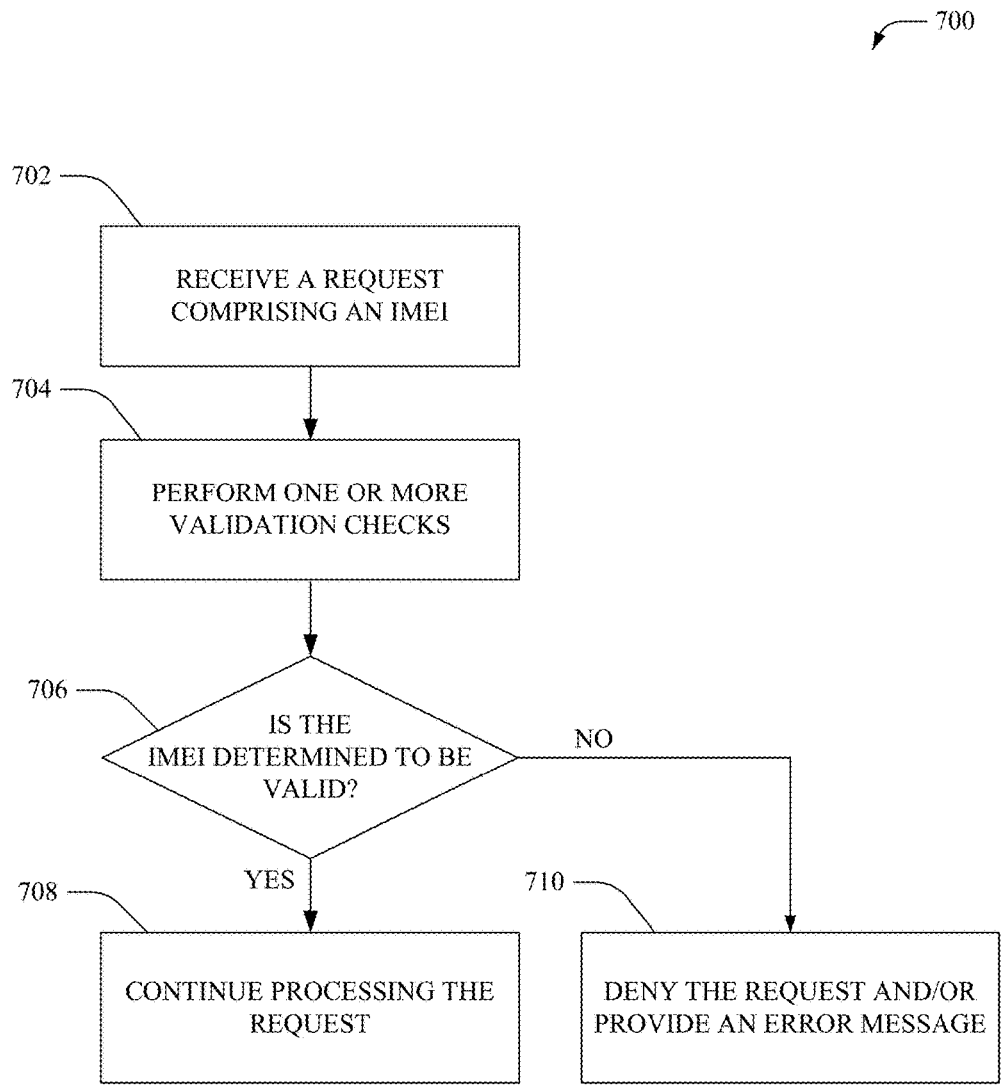
FIG. 7 illustrates an example method that handles communication requests based on IMEI validation.
Figure 8:
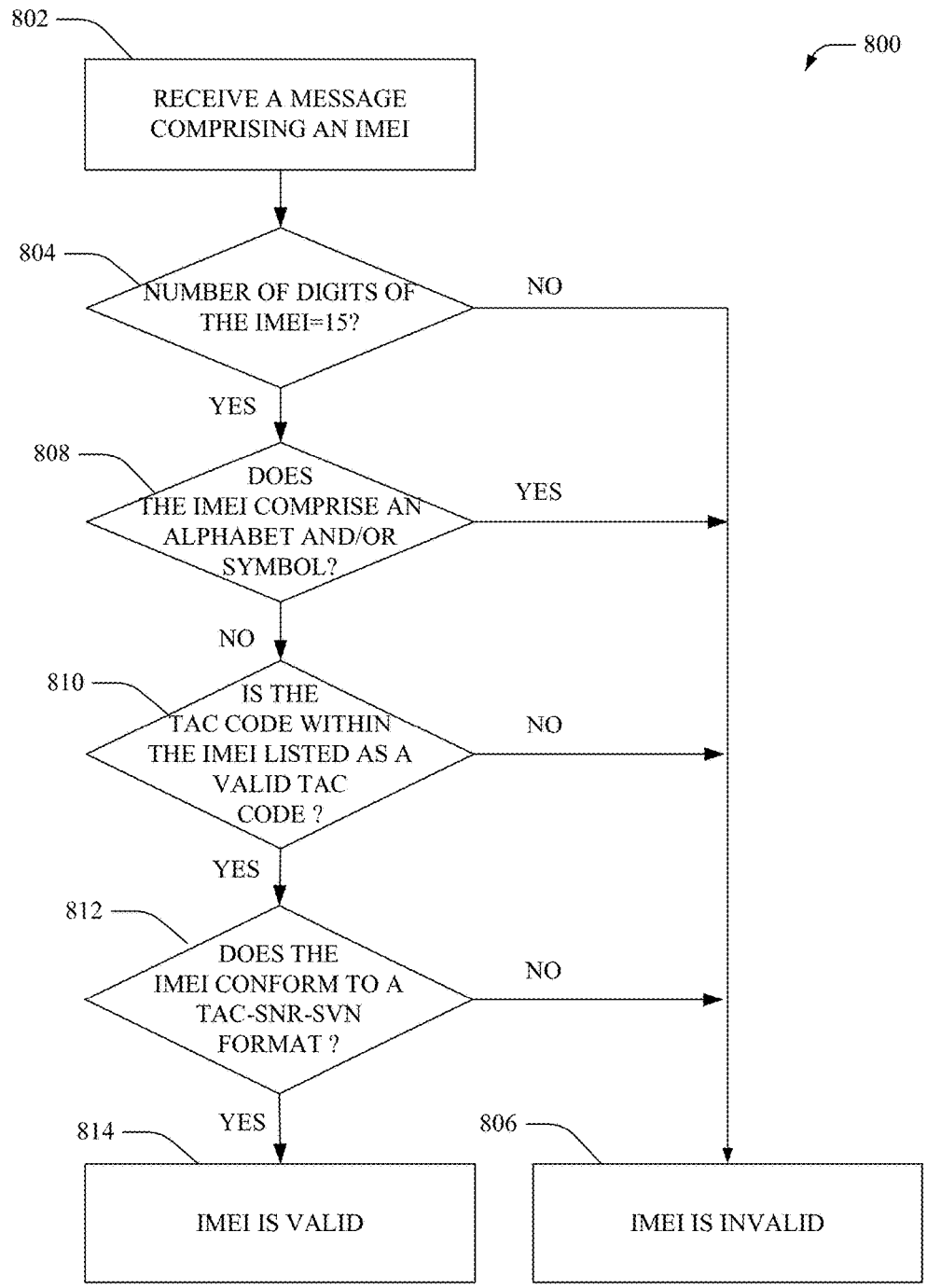
FIG. 8 illustrates an example method provides a validation of an IMEI.

FIGS. 7-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7 there illustrated is an example method 700 that handles communication requests based on IMEI validation, according to an aspect of the subject disclosure. In an aspect, method 700 can be implemented by one or more control plane network devices (e.g., control plane entity 106, MME 202, PGW 302, S-CSCF 402, IMS-HSS 502, etc.) of a communication network (e.g., cellular network). At 702, a request comprising an IMEI (or other device hardware identifier) can be received, for example, as part of subscriber registration. At 704, one or more validation checks can be performed to determine whether the IMEI is valid. For example, the format and/or data structure of the IMEI can be analyzed to determine whether the format and/or data structure conforms to a valid format and/or data structure (e.g., defined by the network operator, industry standards, etc.). At 706, it is determined whether the IMEI is valid. If determined that the IMEI is valid, then at 708, the request can continued to be processed. For example, the IMEI can be added (or appended) to messages that are transmitted to upstream control plane devices to perform subscriber registration. Alternatively, if determined that the IMEI is invalid, then at 710, the request can denied and an error message can be provided, for example, to a downstream device. Additionally or optionally, a message indicative of the error can be transmitted to customer service personnel for resolution of the error. In one aspect, if determined that the request is a request for an emergency service (e.g., 911 call), then the validation checks (704, 706, 710) can be skipped and the method 700 can continue to process the request at 708.

FIG. 8 illustrates an example method 800 that provides a validation of an IMEI, according to an aspect of the subject disclosure. As an example, method 800 can be implemented by one or more control plane network devices (e.g., control plane entity 106, MME 202, PGW 302, S-CSCF 402, IMS-HSS 502, etc.) of a communication network (e.g., cellular network). At 802, a request comprising an IMEI (or other device hardware identifier) can be received, for example, as part of subscriber registration. At 804, it can be determined whether the IMEI comprises fifteen digits. If determined that the IMEI comprises more or less than fifteen digits (or most any defined number), then at 806, the IMEI is determined to be invalid. Alternatively, if determined that the IMEI comprises exactly fifteen digits, then at 808, it can be determined whether the IMEI comprises an alphabet, symbol and/or special character. If determined that the IMEI comprises an alphabet, symbol and/or special character, then at 806, the IMEI is determined to be invalid. Alternatively, if determined that the IMEI only comprises numbers, then at 810, it can be determined whether a TAC code within the IMEI (e.g., first eight digits of the IMEI) is listed as a valid TAC code (e.g., within a network data store). If determined that the TAC code is invalid (e.g., not listed within the network data store), then at 806, the IMEI is determined to be invalid. Alternatively, if determined that the TAC code is valid (e.g., listed within the network data store), then at 812, it can be determined whether the IMEI conforms to a TAC-SNR-SVN format (and/or most any defined format). If determined that the IMEI does not conform to the TAC-SNR-SVN format, then at 806, the IMEI is determined to be invalid. Alternatively, if determined that the IMEI conforms to the TAC-SNR-SVN format, then at 814 it can be determined that the IMEI is valid.

Figure 9:
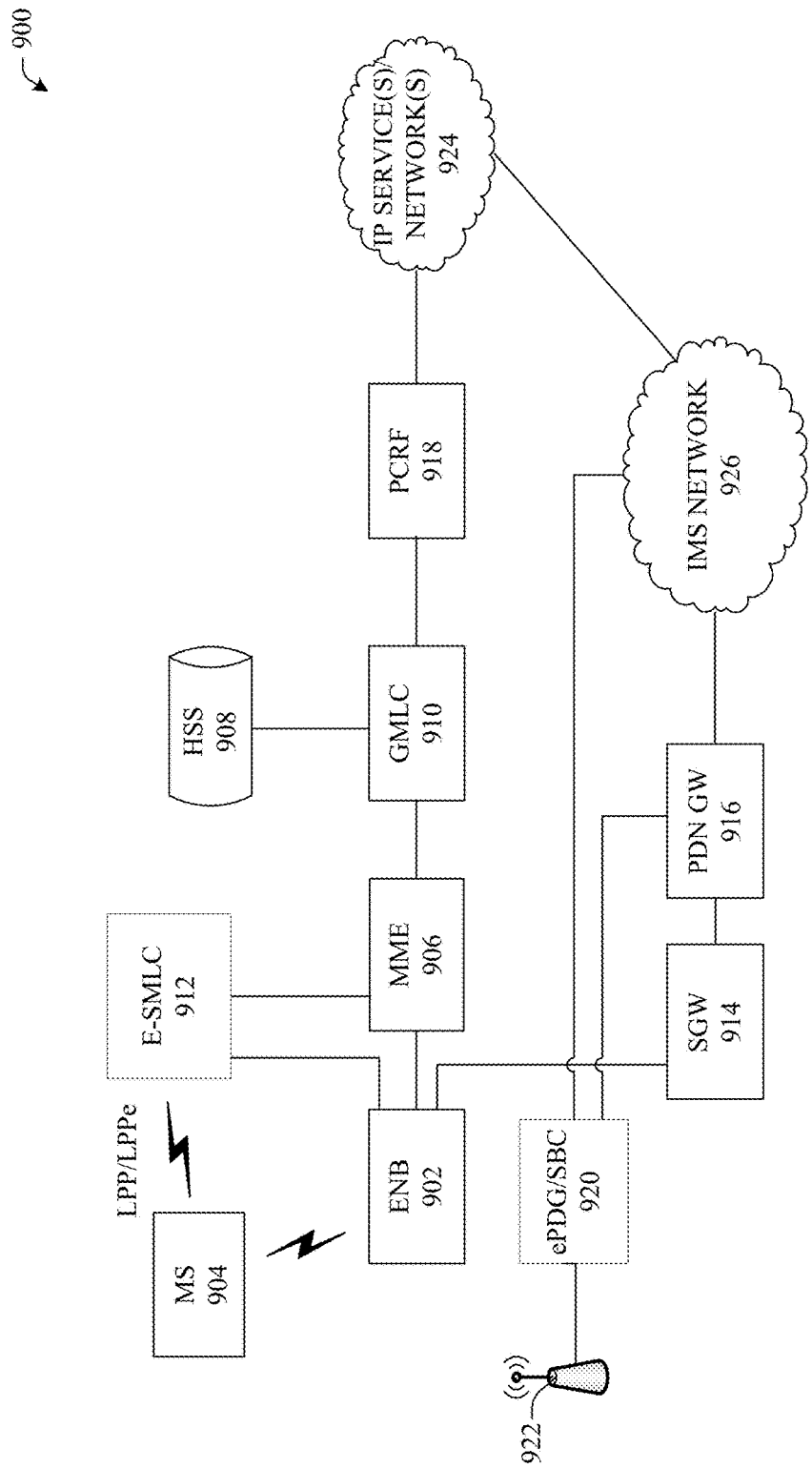
FIG. 9 illustrates a Long Term Evolution (LTE) network architecture that can employ the disclosed architecture.

FIG. 9 illustrates a high-level block diagram that depicts an example LTE network architecture 900 that can employ the disclosed communication architecture. In one aspect, network architecture 900 can comprise at least a portion of systems 100-600. The evolved RAN for LTE consists of an eNodeB (eNB) 902 that can facilitate connection of MS 904 to an evolved packet core (EPC) network. In one aspect, the MS 904 is physical equipment or Mobile Equipment (ME), such as a mobile phone or a laptop computer that is used by mobile subscribers, with a Subscriber identity Module (SIM). The SIM comprises an International Mobile Subscriber Identity (IMSI) and/or MSISDN, which is a unique identifier of a subscriber. The MS 904 comprises an embedded client that receives and processes messages received by the MS 904. As an example, the embedded client can be implemented in JAVA. In one aspect, the MS 904 can be substantially similar to UE 102 and can comprise functionality as more fully described herein, for example, as described above with regards to UE 102.

The connection of the MS 904 to the evolved packet core (EPC) network is subsequent to an authentication, for example, a SIM-based authentication between the MS 904 and the evolved packet core (EPC) network. In one aspect, the MME 906 provides authentication of the MS 904 by interacting with the Home Subscriber Server (HSS) 908 via a Gateway Mobile Location Centre (GMLC) 910. The GMLC 910 can request routing information from the HSS 908. The HSS 908 contains a subscriber profile and keeps track of which core network node is currently handling the subscriber. It also supports subscriber authentication and authorization functions (AAA). In networks with more than one HSS 908, a subscriber location function provides information on the HSS 908 that contains the profile of a given subscriber. In one aspect, this authentication can be utilized to secure population of the user/device profile data by a primary user. Further, the MME 906 can be coupled to an enhanced Serving Mobile Location Center (E-SMLC) 912 supports location services (LCS) and coordinates positioning of the MS 904. The MS 904 and the E-SMLC can communicate using an LTE Positioning Protocol (LPP) and/or LPP extensions (LPPe). In one aspect, the MME 906 can be substantially similar to MME 202 and can comprise functionality as more fully described herein, for example, as described above with regards to MME 202.

As an example, the eNB 902 can host a PHYsical (PHY), Medium Access Control (MAC), Radio Link Control (RLC), and Packet Data Control Protocol (PDCP) layers that comprise the functionality of user-plane header-compression and encryption. In addition, the eNB 902 can implement at least in part Radio Resource Control (RRC) functionality (e.g., radio resource management, admission control, scheduling, cell information broadcast, etc.). The eNB 902 can be coupled to a serving gateway (SGW) 914 that facilitates routing of user data packets and serves as a local mobility anchor for data bearers when the MS 904 moves between eNBs. The SGW 914 can act as an anchor for mobility between LTE and other 3GPP technologies (GPRS, UMTS, etc.). When MS 904 is in an idle state, the SGW 914 terminates a downlink (DL) data path and triggers paging when DL data arrives for the MS 904. Further, the SGW 914 can perform various administrative functions in the visited network such as collecting information for charging and lawful interception. In one aspect, the SGW 914 can be coupled to a Packet Data Network Gateway (PDN GW) 916 that provides connectivity between the MS 904 and external packet data networks such as IP service(s)/network(s) 924 via the IP Multimedia Subsystem (IMS) network 926. Moreover, the PDN GW 916 is a point of exit and entry of traffic for the MS 904. It is noted that the MS 904 can have simultaneous connectivity with more than one PDN GW (not shown) for accessing multiple PDNs. It is noted that the PDN GW 916 can be substantially similar to PGW 302 and can comprise functionality as more fully described herein, for example, as described above with regards to PGW 302. As an example, the IMS network 926 can comprise the S-CSCF 402 and/or IMS-HSS 502.

The PDN GW 916 performs IP address allocation for the MS 904, as well as QoS enforcement and implements flow-based charging according to rules from a Policy Control and Charging Rules Function (PCRF) 918. The PCRF 918 can facilitate policy control decision-making and control flow-based charging functionalities in a Policy Control Enforcement Function (PCEF), which resides in the PDN GW 916. The PCRF 918 can store data (e.g., QoS class identifier and/or bit rates) that facilitates QoS authorization of data flows within the PCEF. In one aspect, the PDN GW 916 can facilitate filtering of downlink user IP packets into the different QoS-based bearers and perform policy enforcement, packet filtering for each user, charging support, lawful interception and packet screening. Further, the PDN GW 916 acts as the anchor for mobility between 3GPP and non-3GPP technologies such as WiMAX and 3GPP2 (CDMA 1X and EvDO). An Evolved Packet Data Gateway (ePDG) 920 is employed for communications between the EPC and untrusted non-3GPP networks that require secure access, such as a Wi-Fi, LTE metro, and femtocell access networks, for example served by access point 922. Although a LTE network architecture 900 is described and illustrated herein, it is noted that most any communication network architecture can be utilized to implement the disclosed embodiments.

Figure 10:
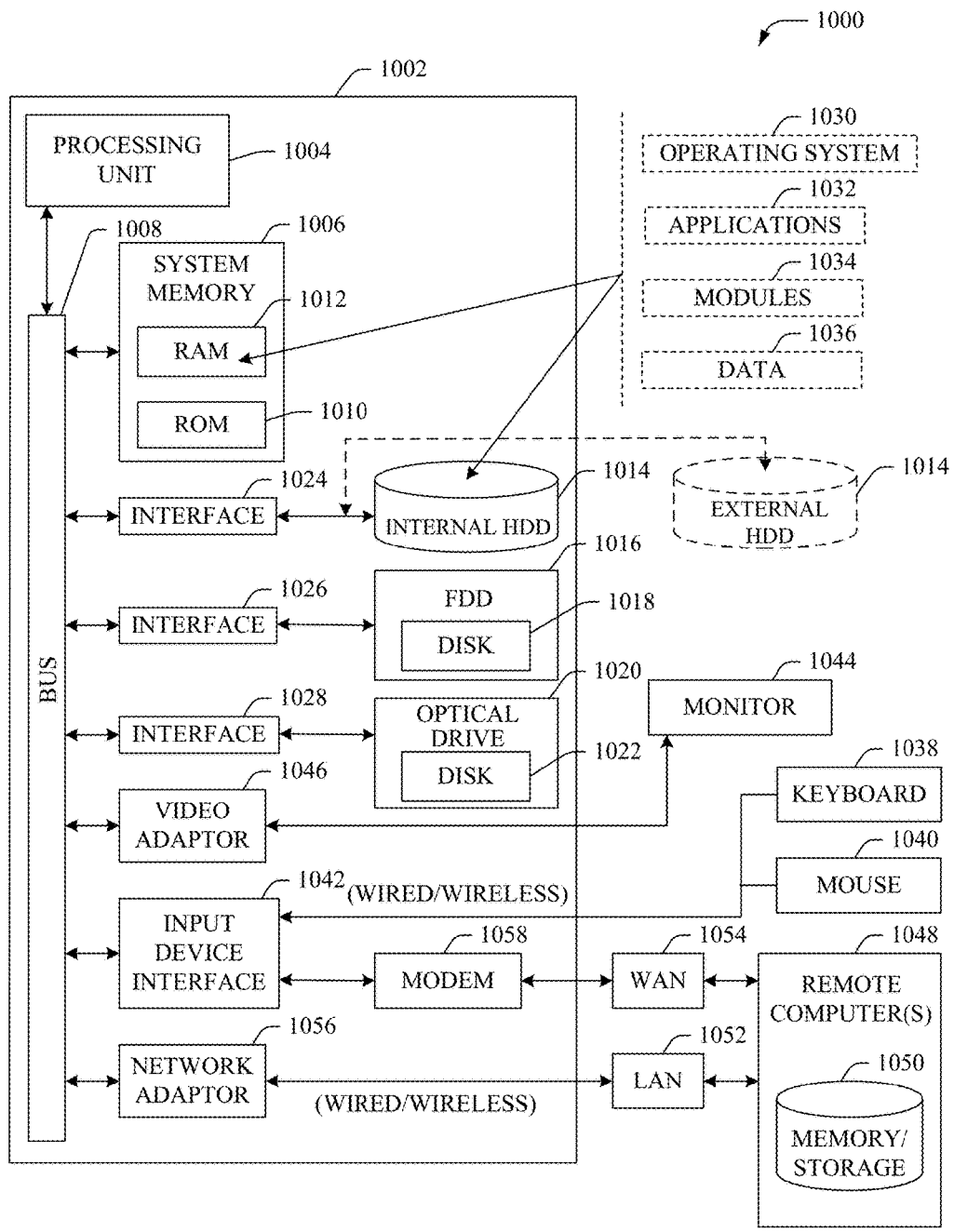
FIG. 10 illustrates a block diagram of a computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 10, the example environment 1000 for implementing various aspects of the specification comprises a computer 1002, the computer 1002 comprising a processing unit 1004, a system memory 1006 and a system bus 1008. As an example, the component(s), application(s) server(s), equipment, system(s), interface(s), gateway(s), controller(s), node(s), entity(ies), function(s), cloud(s) and/or device(s) (e.g., UE 102, access network 104, control plane entity 106, validation components 108 and 108a-108d, MME 202, messaging components 204 304, 404 and 504, PGW 302, S-CSCF 402, IMS-HSS 502, length verification component 602, digit verification component 604, format verification component 606, TAC code verification component 608, eNB 902, MS 904, MME 906, HSS 908, GMLC 910, E-SMLC 912, SGW 914, PDN GW 916, PCRF 918, ePDG/SBC 920, access point 922, IP services/networks 924, IMS network 926, etc.) disclosed herein with respect to systems 100-600 and 900 can each comprise at least a portion of the computer 1002. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is noted that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also comprise a wireless access point disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be noted that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
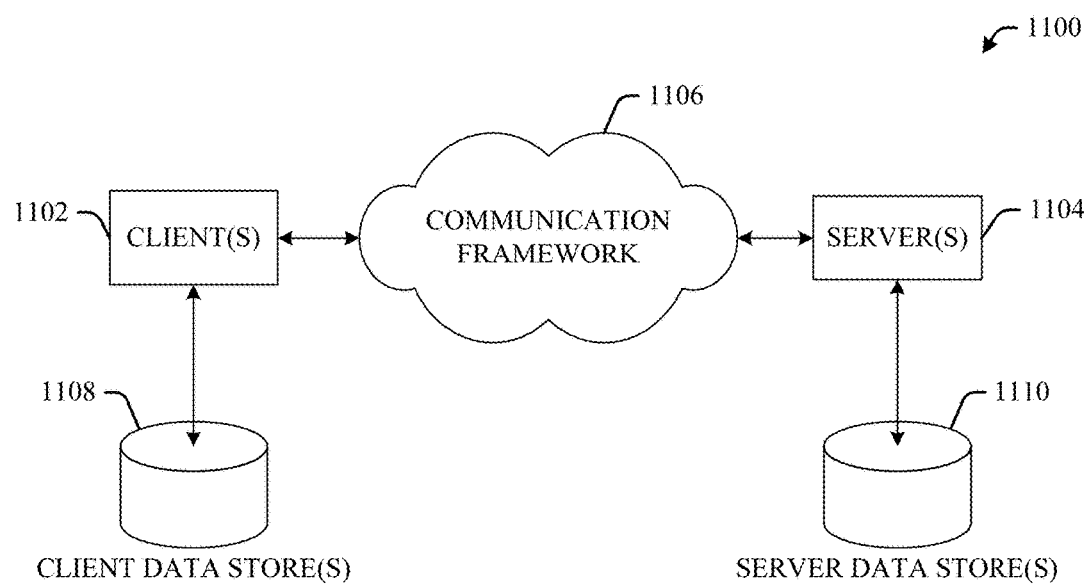
FIG. 11 illustrates a schematic block diagram of a computing environment in accordance with the subject specification

Referring now to FIG. 11, there is illustrated a schematic block diagram of a computing environment 1000 in accordance with the subject specification. The system 1000 comprises one or more client(s) 1102. The client(s) 1102 can be hardware and/or software (e.g., threads, processes, computing devices).

The system 1100 also comprises one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may comprise a cookie and/or associated contextual information, for example. The system 1100 comprises a communication framework 1106 (e.g., a global communication network such as the Internet, cellular network, etc.) that can be employed to facilitate communications between the client(s) 1102 and the server(s) 1104.

Communications can be facilitated via a wired (comprising optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:
1. A control plane device, comprising:
a processor; and
a memory that stores executable instructions that, when executed by the processor, facilitate performance of operations, comprising:

receiving request data indicative of a request to initiate a communication session associated with a user equipment that is served by the control plane device, wherein the request data comprises identifier data indicative of a hardware identifier of the user equipment; and prior to processing the request, validating the identifier data, wherein the validating comprises determining that the identifier data is valid in response to verifying, based on an analysis of the identifier data, that the hardware identifier conforms to a defined identifier format, and wherein the verifying is independent of a communication with a network data store.

2. The control plane device of claim 1, wherein the hardware identifier comprises an international mobile equipment identity.

3. The control plane device of claim 1, wherein the verifying comprises verifying that the hardware identifier satisfies a defined length criterion.

4. The control plane device of claim 1, wherein the verifying comprises verifying that the hardware identifier comprises numerical values.

5. The control plane device of claim 1, wherein the identifier data comprises type allocation code data indicative of a type allocation code, and wherein the validating comprises determining that the type allocation code is valid.

6. The control plane device of claim 5, wherein the determining that the type allocation code is valid comprises determining that the type allocation code matches a code from a group of valid type allocation codes that are stored within a network data store.

7. The control plane device of claim 1, wherein the operations further comprise:

in response to the validating, directing a message comprising the identifier data to a network device to facilitate establishment of the communication session.

8. A method, comprising:

receiving, by a control plane device comprising a processor, request data indicative of a request for initiating a communication session associated with a user equipment that is served by the control plane device, wherein the request data comprises identifier data indicative of a hardware identifier of the user equipment;

determining, by the control plane device, that the identifier data satisfies a defined format criterion, wherein the determining is based on an evaluation of the identifier data without querying a network data store; and in response to the determining, determining, by the control plane device, that the identifier data is valid.

9. The method of claim 8, wherein the determining that the identifier data satisfies the defined format criterion comprises determining that the identifier data conforms to a defined format.

10. The method of claim 8, wherein the determining that the identifier data satisfies the defined format criterion comprises determining that the identifier data comprises a defined number of digits.

11. The method of claim 8, wherein the determining that the identifier data satisfies the defined format criterion comprises determining that the identifier data does not comprise alphabets.

12. The method of claim 8, wherein the determining that the identifier data satisfies the defined format criterion comprises determining that the identifier data does not comprise symbols.

13. The method of claim 8, wherein the identifier data comprises code data indicative of a type allocation code, and wherein the determining that the identifier data is valid comprises determining that the type allocation code is valid.

14. The method of claim 8, further comprising:

in response to determining that the identifier data does not satisfy the defined format criterion, determining, by the control plane device, that the identifier data is invalid.

15. The method of claim 14, further comprising:

in response to the determining that the identifier data is invalid, facilitating, by the control plane device, a transmission of an error message to the user equipment, wherein the error message indicates that the identifier data is determined to be invalid.

16. The method of claim 14, further comprising:

in response to the determining that the identifier data is invalid, prohibiting, by the control plane device, the initiating of the communication session.

17. A non-transitory machine-readable storage medium, comprising executable instructions that, when executed by a processor of a control plane device, facilitate performance of operations, comprising:

receiving request data indicative of a request for initiation of a communication session associated with a user equipment that is served by the control plane device, wherein the request data comprises identifier data representative of a hardware identifier of the user equipment;

in response to the receiving, performing a validation check to determine a validity of a structure of the identifier data, wherein the validation check comprises an analysis of the identifier data that is independent of a communication between the control plane device and a network register device; and in response to determining that the structure of the identifier data is valid, facilitating an establishment of the communication session.

18. The non-transitory machine-readable storage medium of claim 17, wherein the operations further comprise:

in response to determining that the structure of the identifier data is invalid, denying the request for the initiation of the communication session.

19. The non-transitory machine-readable storage medium of claim 17, wherein the operations further comprise:

in response to determining that the structure of the identifier data is invalid, providing an error message to the user equipment, wherein the error message indicates that the identifier data is determined to be invalid.

20. The non-transitory machine-readable storage medium of claim 17, wherein the performing comprises performing the validation check in response to determining that the communication session is not associated with an emergency service.

* * * * *